ELECTRONIC COMPUTER WITH INTERRUPT FEATURE

CAREL S. SCHOLTEN
BRAM J. LOOPSTRA INVENTORS

BY

Hugh A. Kirk
ATTY.

Feb. 26, 1963 C. S. SCHOLTEN ETAL 3,079,082

ELECTRONIC COMPUTER WITH INTERRUPT FEATURE

Filed June 26, 1959 4 Sheets-Sheet 2

CAREL S. SCHOLTEN - BRAM J. LOOPSTRA *INVENTORS*

BY Hugh A. Kirk ATTY.

CAREL S. SCHOLTEN
BRAM J. LOOPSTRA INVENTORS

BY Hugh A. Kirk
ATTY.

CAREL S. SCHOLTEN
BRAM J. LOOPSTRA INVENTORS

BY

Hugh A. Kirk
ATTY.

United States Patent Office 3,079,082
Patented Feb. 26, 1963

3,079,082

ELECTRONIC COMPUTER WITH INTERRUPT FEATURE

Carel Steven Scholten, Amsterdam, and Bram Jan Loopstra, Amstelveen, Netherlands, assignors to N.V. Electrologica, The Hague, Netherlands
Filed June 26, 1959, Ser. No. 823,180
Claims priority, application Netherlands June 30, 1958
20 Claims. (Cl. 235—157)

Figure 1A:
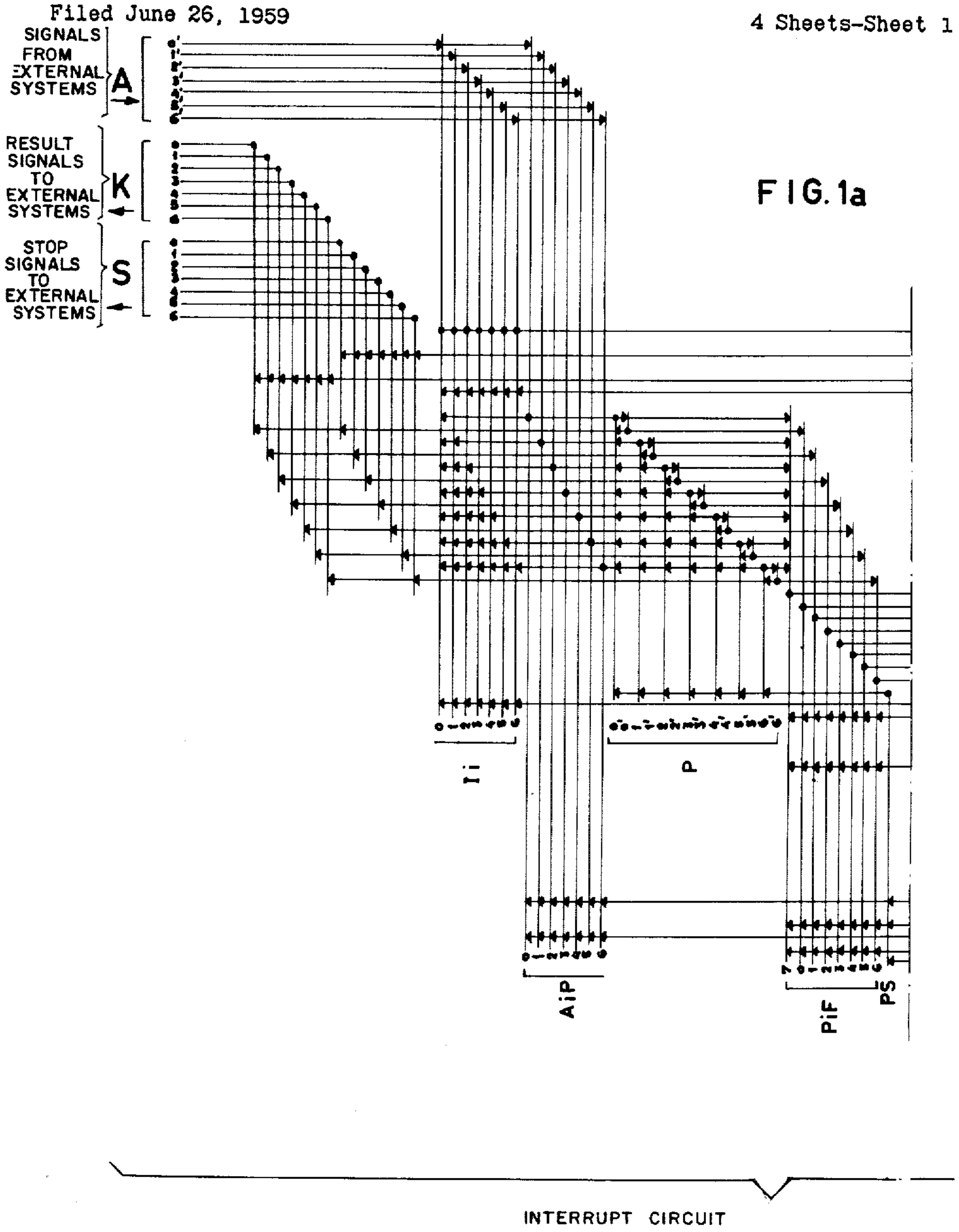

This invention relates to electronic computers and its main object is to provide an electronic computer capable of performing a number of tasks simultaneously in such a way, that neither the tasks nor the associated programs become interdependent, thereby making a more efficient use of the speed of the computer than otherwise would be possible.

The efficiency of an electronic computer is largely determined by the ratio of computing time to total time, and this ratio can be improved by eliminating waiting periods. Waiting periods occurring during the execution of a program, for instance those caused by slow input and output devices, are part of the execution time of a program and can be characterized as internal waiting periods.

From an article in I.R.E. Transactions on Electronic Computers, vol. EC–7, No. 2, July 1958, pp. 141–149, "Realization of Randomly Timed Computer Input and Output by Means of an Interrupt Feature," it is known, that these internal waiting periods can largely be eliminated by equipping the computer with an interrupt feature. The result of the elimination of internal waiting periods is, that the execution time of the program is shortened.

If however the computer repeatedly performs a task in an external system with a cycletime that is essentially independent of the speed with which the computer executes its associated program, elimination of internal waiting periods will not result in higher efficiency, because the time gained in the program will be added to the waiting periods between consecutive executions of the program. These waiting periods can be characterized as external waiting periods of a program and cannot be eliminated by design features of the computer. Improved efficiency can however be obtained by filling these external waiting periods with other tasks. It is possible to do this by means of standard programming facilities. It is for instance possible to connect the computer to a number of external systems, such as output and input tapes, and to synchronize these systems in such a way that the periods in which the systems use the computer do not coincide.

Often a number of computer tasks is available that cannot be synchronized. If a number of nonsynchronous external systems timeshare a computer, the execution periods of the associated programs will coincide once in a while and the computer will fail in some of the systems. This is usually unacceptable.

Nevertheless, it is possible to use a computer simultaneously in a number of nonsynchronous systems. Very often the time the computer needs to execute a program is only a fraction of the time available for the computer task in the associated system. This "available time" is usually determined by a moment when execution of the program becomes possible (for instance because the necessary input information has become available) and the moment when the information output of the computer must be used. If the time necessary to execute the program, the "program time" is shorter than the "available time," a "margin time" is left, which is a part of the external waiting period.

How this margin time is distributed over the available time is not important for the successful operation of the computer in such an external system.

The possibility to use a computer in a number of such external systems simultaneously even if they are nonsynchronous depends on this degree of freedom.

Suppose that a task A must be performed simultaneously with a task B and the program time of A is longer than the margin time of B and the margin time of A is longer than the program time of B. When both tasks coincide, correct results still will be obtained if program B is executed first. When program A has already started, correct results can still be obtained if program A is interrupted, program B executed and after that program A is resumed and finished. It is possible to do this with standard programming facilities. It is possible to program in program A interrupting points by inserting a number of orders at these points, to obtain the information whether B needs the computer or not and jump by means of conditional orders to program B. Program B must begin with some orders, transferring the contents of the registers to memory and end with restoring them, followed by a jump to A. The spacing of these interrupting points in time must be shorter than the margin time of B. Adding more tasks means programming more interrupting points and adding tasks with short margin times means programming closely spaced interrupting points in program A and B. Objections against this procedure are:

(1) Programming becomes very cumbersome.

(2) Many extra orders waste time and memory space.

(3) The spacing of the interrupting points reduces the margin time of the other programs and limits the number of tasks that can be combined.

(4) Changes in the combination of tasks necessitate reprogramming.

(5) The occurrence of conditional commands makes it difficult to foretell in which way the computer will execute a certain program.

The invention overcomes these objections by using an interrupting facility, the fundamental principle being similar to the principle of the known interrupt feature but being used to eliminate internal waiting periods.

The design of this prior art interrupt feature is however not suited to the object of the invention. For the object of this invention the interrupt feature should preferably have the following properties:

(1) It must be possible to interrupt a program that already has interrupted another program by means of the interrupt facility. In the version of interrupt, published in the I.R.E. transactions above cited, an interrupting program can not be interrupted (see page 142 lower part of first column where it considers this as impossible).

(2) Means must be provided for distributing the margin times sensibly over the available times.

(3) The contents of the registers of an interrupted program must be stored. The storage addresses, or locations of and for information bits, should preferably be associated with the interrupted program. In this way the continuation of an interrupted program becomes dependent on the completion of the interrupting program.

(4) The information showing which program is being executed should preferably be registered in the computer such as by contacts in the machine.

(5) It should be possible to start and stop the programs individually without interfering with the execution of other programs.

The above mentioned or cited prior art interrupt version does not provide for the properties 4 and 5.

With the circuit described in the cited IRE Transactions, it is only possible to interrupt the main program. This interruption will take place always if one or more external systems call the computer. If there is only one, the priority circuit has no function. When two calls of different priority arrive at the same time, the program having the highest priority is chosen. This will happen relatively often, due to the fact that during the processing of an interrupt program, which itself cannot be interrupted, two or more external systems call upon the computer with small time intervals. When the program under execution is completed and the computer tries to return to the main program, it will find two or more seemingly simultaneous new calls.

In the circuit according to the invention it is possible under certain circumstances to interrupt a program that itself has interrupted the main program or even any other program. The following conditions should be fulfilled:

(1) Any program can be interrupted only by programs of higher priority and not by programs of the same or lower priority, or in the case that it is impossible to complete the program.

(2) Any program can be interrupted only during those intervals where the interruption will not lead to confusion. For instance, interruptions are not allowed during storing or restoring register-data or within the execution of any single command.

The surprising advantages of this system which are obtained at very low additional cost can be illustrated by introducing the notion of "essential haste situation."

A number of input and output apparatus have a fixed cycle time, for instance a punch-card reader. It is desired that the flow of punch-cards is continuous. If the computer cannot deal with a card which is in the position for being read, the flow of the cards must be stopped. Thereby much more time is lost than is normally required for a reading cycle. In an electric typewriter this difficulty cannot occur. In order to avoid said loss of time, the designer will allocate a priority rank to each of the input and output apparatus so that the interrupt-facility always can make allowance for the "essential haste situation."

The command cycle required for typing a symbol can therefore be interrupted in behalf of the card-reader, even if it has called the computer at a later moment than the typewriter. The periods during which no interruption is allowed are very short compared with the slowness of mechanical input and output apparatus and have no detrimental influence. In this way the most critical external system determines the succession of the programs, which results in a very efficient time-sharing for the whole installation.

The same effect is found when the installation is used to control several equivalent industrial processes. In that case it is often found that the measurements are available only during a relatively short time. Again we find an "essential haste situation."

The programs for the industrial processes must be separated into several sub-programs with different urgency ranks, as for instance: the reading of measurements, data-processing, communication of decisions to the external systems. If measurements arrive during the data-processing of one of the other sections, the interrupt feature takes care that first of all the measurements are taken over by the computer. Consequently the measuring and control devices of the external systems can be considered as equivalent to the well-known input and output instruments or devices.

The above mentioned and other features and objects of this invention and the manner of attaining them will become more apparent and the invention itself will be best understood by reference to the following description of embodiments of the invention taken in conjunction with the acompanying drawings, wherein:

FIGS. 1*a* and *b* show a schematic circuit diagram of one embodiment of the interrupt that fully satisfies the above mentioned requirements and illustrates the principles of this invention.

Figure 1B:
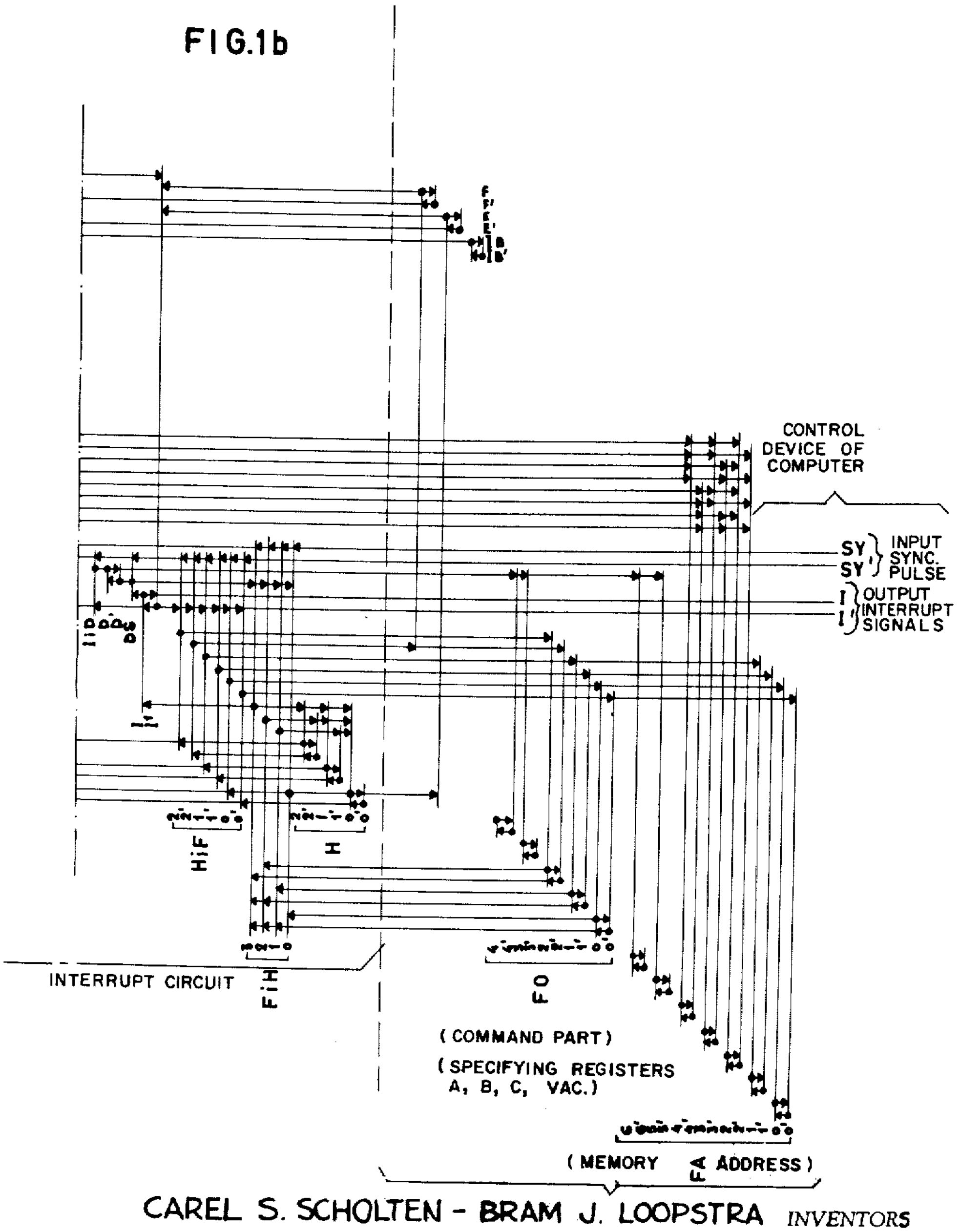
Figure 2A:
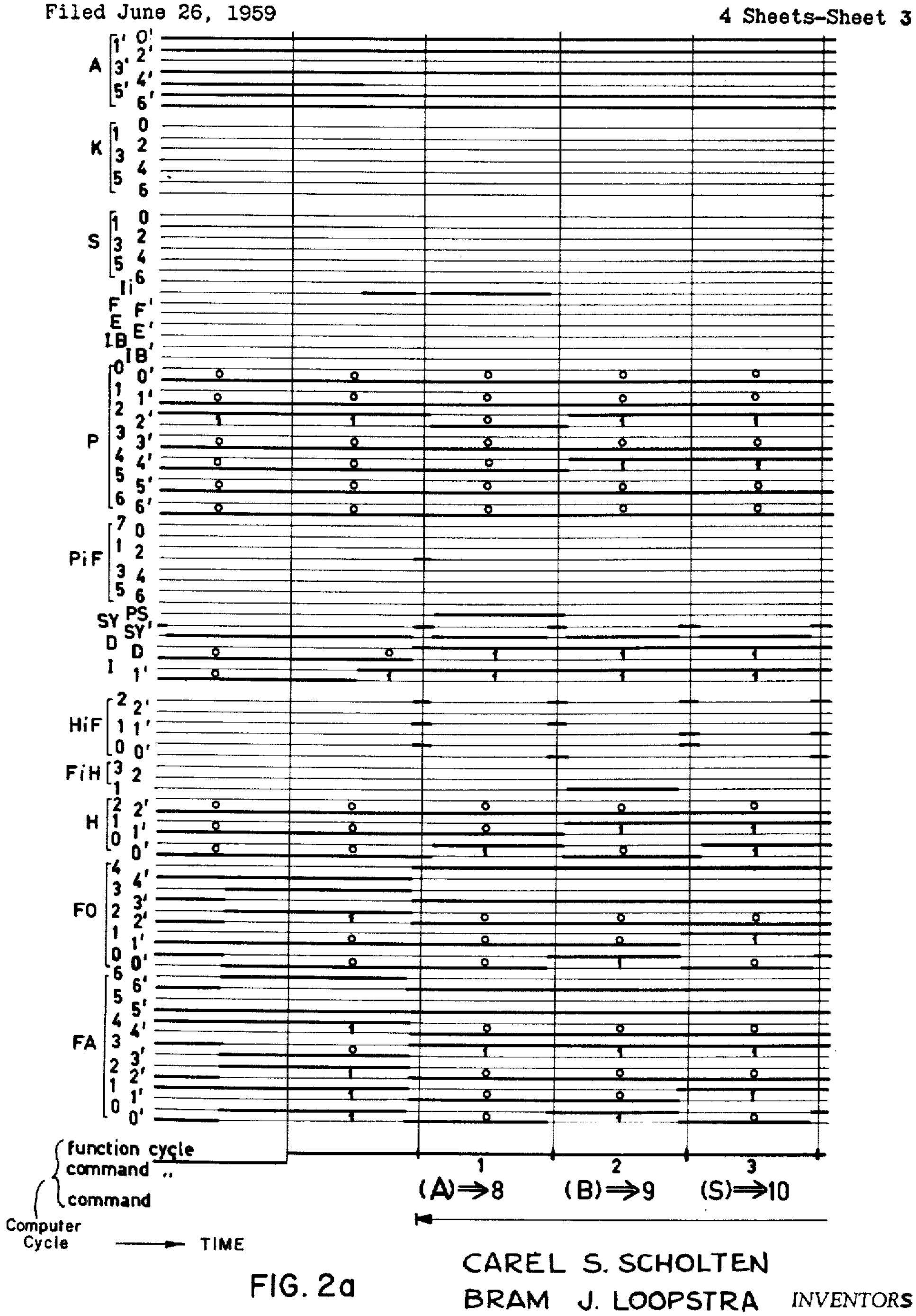
Figure 2B:
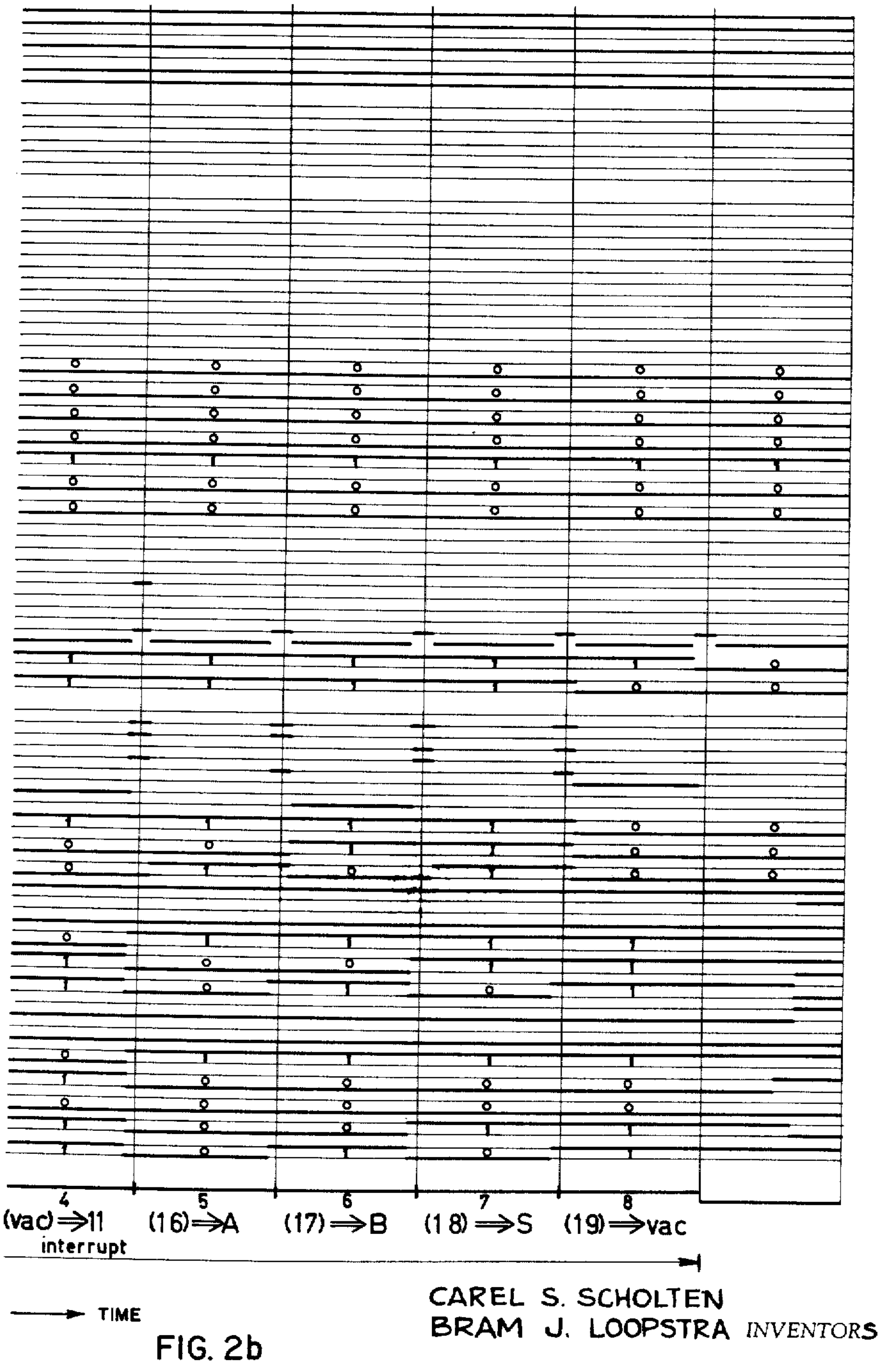

FIGS. 2*a* and 2*b* are a time diagram of one example of an interrupt program according to the circuit shown in FIGS. 1*a* and 1*b*.

It is mentioned that the realization of this invention will vary with the adopted switching technique and the organization of the computer that is to be equipped with the interrupt facility. The example of FIG. 1 is kept as general as possible in these respects. A pure direct-coupled logic is used and throughout the circuit only one type of logical units is used, consisting of an "AND"-circuit followed by a "NOT"-circuit, for instance a multi-diode input-circuit, followed by an inverting (transistor) amplifier. The steady-state signals can either be "high" or "low" and thus represent a "1" or a "0," respectively.

The diagrams consist of a matrix. The rows represent signals, the columns represent logical units. At the cross-points of the horizontal lines (signals) and the vertical lines (logical units) connections (if any) between both are shown by means of a symbol. A dot shows that the signal is connected to the output of the unit. An arrow shows, that the signal is connected to an input of the unit. The diagrams obtained in this way can be read as logical diagrams and as wiring diagrams and combine surveyability and compactness.

Because of the D.-C. character of the logic, the operation of the circuits can be followed by application of a few logical rules. These are:

(1) If and only if all inputs of a logical unit are low, will the unit supply a high output signal.

(2) If a signal is connected to the outputs of a number of logical units, it will be high if at least one of the outputs is high or if a high state is introduced from sources outside the diagram.

The names of signals are given at the beginning or the end of the signal lines, the names of the logical units below or above the unit lines.

If two units are so arranged, that the output of each unit is connected to an input of the other unit, they act as a flipflop, multivibrator, switch, or trigger circuit.

To the left of the vertical dashline in FIG. 1*b* is shown the interrupt circuit and to the right a number of flipflop register elements of the computer that interact with the interrupt circuit. Synchronization of the interrupt circuit with the computer is achieved by means of the sync-pulse signals SY and SY′ coming from the control device of the computer and influencing the interrupt circuit, and the signals I and I′, coming from the interrupt circuit and influencing the computer control device.

The computer cycle is supposed to consist of two parts: (1) a command cycle and (2) a function cycle.

In part 1, the command cycle, a command is transferred from the memory address specified by the VAC-register or address counter (see also column 5, lines 36–39) in control device of the computer to a function control register FA—FO, and in case the VAC register is a counter, a "1" is added to its contents.

In part 2, the function cycle, the command specified by register FA—FO is executed. The sync-pulse signals SY—SY′ mark the switching over from part 2 to part 1 of the computer cycle. On switching over, signal SY is high (SY′ low), and signal I is low (I′ high).

If signal I is high, the high signal SY, coming at the end of the function cycle (2) does not start a new command cycle (1) but instead the function cycle (2) is restarted.

As long as the signal I remains high, the function cycle (2) will thus be repeated. The way to achieve this depends on the design of the clock pulse commanded sequencing control device and is not shown. Most types of control devices can easily be adapted in this way. The contents of register VAC are not to be disturbed during a function cycle (2), unless the command in register FO—FA specifies this. Register FO is supposed to contain the command part and FA the memory address involved in the command, both of which are shown as a number of flipflops. Register VAC contains the memory address of the next command to be executed.

The number of bits of this VAC register will usually be less than the number of bits of the machineword and in order to limit the number of transfers between registers and memory at interrupt, this register VAC is combined with a number of computer registers (overflow, condition, etc.) each consisting of only a few bits. They are combined in such a way that the contents of all of these registers together can be transferred to and from the memory in one function cycle (2) (with one command). The registers F and IB belong to this combination. Registers F, E and IB are specially supplied for the interrupt. E and F initiate an immediate interrupt if they contain a "1," register IB inhibits interrupt from sources external to the computer if it contains a "1."

The contents of E and IB can be controlled by means of commands, register F is controlled by internal means, that are used in a non-interrupt computer to stop the machine (for instance the checking device). Register E can be used to command an interrupt operation and the purpose of register IB is to prevent interrupt in a certain program location.

At interrupt, the contents of the computer registers must be transferred to memory and substituted by the contents of a number of memory addresses. Four registers, A, B, S and VAC, are supposed to be transferred in this way. The exact number of register transfers is not an essential part of the invention. It may be smaller or larger but should at least contain the register VAC.

The following assumptions are made about the command register FO:

Flipflop $FO_3$ and higher i.e. $FO_4$ specify during the interrupt operation, that a transfer is executed between registers and memory.

$FO_2$ specifies whether the transfer is from register to memory $((FO_2)=0)$, or from memory to register $((FO_2)=1)$.

$FO_1$ and $FO_0$ specify the register involved in the transfer.

$(FO_1, FO_0)=00$ specifies register A.

$(FO_1, FO_0)=01$ specifies register B.

$(FO_1, FO_0)=10$ specifies register S.

$(FO_1, FO_0)=11$ specifies register VAC.

Register FA specifies the memory addresses, involved in the transfers. $FA_0$ and $FA_1$ specify together groups of four consecutive memory addresses. $FA_2$, $FA_3$ and $FA_4$ specify eight consecutive groups of four addresses. Each group of four addresses is associated with one of the simultaneous programs. The circuit can easily be adapted for a larger or smaller number of simultaneous programs.

Three groups of seven signals at the left side of the circuit diagram (FIG. 1*a*) take care of the communication between the interrupt circuit and the external systems, enabling a maximum of seven external systems to interrupt the computer. Adaptation to a smaller or larger number can easily be obtained. The signals $A_0'$ up to and including $A_6'$ are derived from the external systems and their low state indicates that the external system is in the part of its cycle in which the computer can and must perform its associated program.

Signals $K_0$ up to and including $K_6$ are outgoing signals from the interrupt circuit and their high states convey to the external systems the information that in their associated program a commond is executed, setting register E to "1." This could mean, depending on the circuits in the computer, that the program is completed and the K-signal can be used to reset the corresponding A-signal.

Signals $S_0$ up to and including $S_6$ are outgoing signals that convey to the external systems the information, that their associated program has stopped by the setting of register F by another or internal interruption. As the program will not be completed the signal S may be used to take the necessary actions in the external system, associated with the stopped program.

The switching units $Ii_0$ up to and including $Ii_6$ form a simple circuit for distributing the margin times over the available times in such a way that, even if tasks coincide, they are all performed in time. This is done by arranging the tasks according to their urgency. This urgency depends mainly on the margin time of the program and the program times of the programs of higher urgency rank. The Ii circuit only allows A' signals of a rank higher than the program that is executed, to initiate interrupt. If such a low A' signal is present, the interrupt acts immediately and no further commands of the running program are executed. The Ii circuit can be inhibited by IB. The information showing which program is running, is contained in the P-register, consisting of the flipflops $P_0$ up to and including $P_6$. The registers I, D and H control the interrupt operations, as will be described below in a specific example.

The functioning of the interrupt will be explained by an example in which a program of rank 2 is interrupted by a program of rank 4. The timing diagram of this example is given in FIGURE 2*a* and *b*, consisting of a number of horizontal lines, denoting the signals in the circuit of FIG. 1 in the same vertical order. Time proceeds from the left to the right. Thin parts of the signal lines indicate low steady-state signals. The computer cycle is shown below the signals.

At the beginning, signal $A_2'$ is low, program 2 of rank 2 is running as shown by flipflop $P_2$, containing a "1" (see FIG. 2*a*). The contents of register FA—FO are randomly chosen. They depend on the command being executed.

After some time signal $A_4'$ turns low, denoting that program 4 of rank 4 can be executed. All inputs to switching unit $Ii_4$ are now low, so output $Ii_4$ gives a high signal *Ii*. This signal is connected to an input of unit I' and sets flipflop I—I' to "1" (I high, I' low) (see FIGS. 1*b* and second column in FIG. 2*a*). Nothing happens until the function cycle of the computer is completed. At this moment the sync-pulse (SY high, SY' low) restarts the function cycle, instead of a new command cycle because flipflop register I is now high.

In the interrupt circuit the sync-pulse SY signal is connected to inputs of the *Ii*-units in order to prevent initiation of the interrupt during the sync-pulse. Its influence on the *Ii* signal is to turn it off, which it does, but this has no further consequences since flipflop I has been set already.

Signal SY' is connected to the read-in amplifier units *PiF*, that is, register content P goes into register F. Since SY' is low, unit $PiF_2$ has only low inputs and delivers a high output signal $PiF_2$ (see FIG. 2*a*) driving the flipflops $FA_2$, $FA_3$ and $FA_4$ into that state that specifies the group of four memory addresses, associated with program 2. In the same way the flipflops $FA_0$, $FA_1$, $FO_0$, $FO_1$ and $FO_2$ are driven in the "0"-state (see FIG. 2*a*) during the syncpulse by HiF read-in amplifier signals, that is, register content H goes into register F. Signals SY' and I are both low and drive flipflop D in the "1" state by means of unit *IiD*, the flipflops $FA_5$, $FA_6$ (et seq. if any) in the "0" state, and flipflops $FO_4$, ($FO_5$ and so on not shown) into that state that specifies that a transfer between registers and memory must be executed.

The effect of the sync-pulse SP[1] is, that a new function cycle is started with the FO—FA register, specifying the command: transfer the contents of register (A) to memory address 8 in the computer (not shown), or (A) $\Rightarrow 8$ (see bottom of third column in FIG. 2a).

While this command is executed, signal SY is low. Signal D' is now low too, thus unit $FiH_0$ delivers a high signal $FiH_0$ (same as signal $H_0$ in FIG. 2*a*), that drives flipflop $H_0$ in the "1" state (see FIG. 2*a*). Signal PS (now high for one setting of H-counter only) clears the P-register.

In this function cycle the command $(A)\Rightarrow 8$ is executed. At the end of the cycle the sync-pulse (SY high) starts a new function cycle. At the same time register FO is driven in the state 001, by means of the signals $HiF_2$ $HiF_1$ and $HIF_0'$. Register FA is driven in the state 01001 ($F_0=F_3=1$). The F-register (see FIG. 1*b*) now specifies the command (B)=>9.

When SY is low again, $FiH_1$ (high) drives register H in the state 010. The signals $H_2$ and $H_1'$ (now low), are connected to the read-in amplifier units A*i*P that is, register content A goes into register P, $AiP_2$ and $AiP_4$ deliver a high signal setting the flipflops $P_2$ and $P_4$ to "1." At the end of each function cycle the interaction of the H*i*F units and register FA—FO and the F*i*H units and register H repeats itself, (as long as I contains a "1"). In this way 8 consecutive commands are executed (controlled by register H and its associated circuitry). The commands are (see command cycle times at lower part of FIGS. 2*a* and 2*b*):

Transfers from registers to memory addresses associated to program 2.

(H)=0:(A) to memory address 8
(H)=1:(B) to memory address 9
(H)=2:(S) to memory address 10
(H)=3:(VAC) to memory address 11

Transfers from addresses associated with program 4 to registers.

(H)=4:(16) to register A
(H)=5:(17) to register B
(H)=6:(18) to register S
(H)=7:(19) to register VAC At the beginning of the 4th cycle the units $AiP_2$ and (or $P_2$) and $AiP_4$ (or $P_4$) are switched off. Flipflop $P_4$ remains in the "1" state, $P_2$ is reset. Register P now contains the information that program 4 is executed. (This setting of register P is retained until the next interrupt.)

At the end of the 4th cycle (SY high) all inputs of unit $PiF_4$ are low. The high signal $PiF_4$ drives the flipflops $FA_2$, $FA_3$ and $FA_4$ in the state specifying the group of four memory addresses associated to program 4.

At the beginning of the 8th cycle flipflop I is reset by signal $FiH_3$ and at the end of this cycle flipflop D is reset by unit DS (or D'). As register of flip-flop (I)=0, this cycle will be followed by a command cycle (see bottom of column "8" in FIG. 2*b*). Register VAC contains now the address of the command, following the last executed command of program 4. The object of the interrupt operation is realized.

The signals of the flipflops E and F (see FIG. 1*b*) can set flipflop I, independently of the I*i* units, thereby initiating an interrupt operation. This provides the possibility of switching to a lower ranking program by means of the interrupt facility. In such case the A' signal of the executed program must be reset. Signals K and S can be used for this purpose. If no lower ranking A' signal is low, the computer is switched to a time-independent program, by means of unit $PiF_7$. This program is necessary, to keep the computer busy during waiting periods.

The circuit of FIG. 1 brings about all interrupt operations by technical means. It has already been mentioned that all necessary interrupt operations can be realized by means of programmed commands. It is also possible to realize the invention, partly by technical means, partly by programming. It is for instance possible to transfer only register VAC to memory and to jump to the first command of the interrupting program by technical means. This program can start with commands that transfer the contents of the other registers to memory addresses, associated with the interrupted program and placing the contents of its own associated memory addresses in the registers followed by a jump to the command next to the last executed command.

Another possibility is to place the contents of the registers of the interrupted program in memory addresses, associated with the interrupting program, to restore them at the end of this program and to return to the interrupted program by means of a jump command. It has a drawback, however. In this way the return to an interrupted program becomes dependent on the completion of the interrupting program. If this program cannot be completed the return is not possible.

By associating the addresses where the contents of the registers of an interrupted program are stored to the program itself, it is possible to return to the program by means of the interrupt and a return is always possible as far as the computer is operating. This leaves it to the designer to distribute the margin times over the available time in any way he thinks useful.

While there is described above the principles of this invention in connection with specific apparatus, it is to be clearly understood that this description is made only by way of example and not as a limitation to the scope of this invention.

We claim:

1. An electronic computer, equipped with an interrupt facility enabling the computer to perform a number of simultaneous tasks such that each task can be programmed independently of the characteristics of other simultaneous tasks, and of the characteristics of asynchronous external systems associated with the task-programs for said computer, said interrupt facility including means to distribute the margin time, said margin time being the difference between the time available in the external system for the performance of the task and the time required for the computer to execute the associated program, said means distributing the margin time of each program over the available time for each task so that each task is performed in time, and means controlled by said distributing means in said interrupt facility for interrupting at least one of the programs associated with the simultaneous tasks which is capable of interrupting, as well as being subject to possible interruption by at least one of the other programs by said interrupt means.

2. An electronic computer according to claim 1 wherein said distributing means includes a device for controlling the distribution of the margin times over the available times.

3. An electronic computer according to claim 2 wherein said device initiates an interrupt operation as soon as the execution of a program of an urgency rank higher than the program under execution becomes possible.

4. An electronic computer according to claim 1 including means for storing the contents of the registers and the address counter of an interrupted program and for associating the memory addresses where this storing takes place with the interrupted program, whereby a return to an interrupted program by means of the interrupt facility is possible.

5. An electronic computer according to claim 1 including means for controlling said interrupting means at least in part.

6. An electronic computer according to claim 5 including means in said interrupt facility to switch to an interrupting program, containing the necessary programmed operations to determine which program is to be executed and to save and restore register contents of said interrupted program.

7. An electronic computer according to claim 1 wherein said interrupt means includes electronic switches used to initiate the interrupt cycle if and when internal control systems of the computer have stopped the execution of a program.

8. An electronic computer according to claim 1 including means to selectively supply the external system associated with the program with signals denoting that its associated program is stopped by internal causes.

9. An electronic computer according to claim 1 including a register consisting of a smaller number of bits than the machine word, and in combination therewith a number of computer registers, consisting of at least one of a few bits, so that their combined contents can be transferred in one operation to one memory address.

10. An electronic computer according to claim 1 including means to selectively supply the external system associated with the program with signals denoting that its associated program is stopped by means of a programmed command.

11. An electronic computer including an interrupt circuit for enabling the performance of a plurality of independent tasks simultaneously, said interrupt circuit comprising: means for distributing margin times over the available time for each task so that each task is performed in its proper time, said margin times being the times within the time available for completing each task less the time required for the computer to execute said task, and means for interrupting the program performing one task in said computer by a program for performing another independent task under the control of said distributing means.

12. A computer according to claim 11 including means for storing data of the interrupted program until said interrupting program is completed.

13. A computer according to claim 12 wherein said storing means is associated with an address of said interrupting program.

14. An electronic computer according to claim 12 including means to prevent interruption of a program being executed by said computer by said interrupt circuit during the periods used for storing and restoring said data.

15. An electronic computer according to claim 11 wherein said distributing means includes means for selecting interrupting programs based upon their urgency.

16. An electronic computer according to claim 15 wherein said selecting means includes means for initiating the functioning of said interrupting means.

17. An electronic computer according to claim 15 wherein said selecting means is controlled by internal means in said computer.

18. An electronic computer having control devices, registers, calculator means, means to generate sync-pulse signals, and means to execute a plurality of independent programs simultaneously, each having available time in an external system for their completion greater than the time necessary for their execution by said computer whereby a margin time difference is provided, the improvement comprising an interrupt circuit connected to and controlled by said control devices and sync-pulse signals, said interrupt circuit comprising: means for ranking the programs to be executed according to their predetermined urgency, means to select another program, means to interrupt a program being performed by said computer, means to again interrupt a program of lower urgency rank being performed by said computer by a program of higher urgency rank, means to store data of the interrupted program, means to initiate execution of said selected program by said computer, means to signal completion of said selected program to said computer, and means to transfer said stored data of an interrupted program back to said computer for completion of the interrupted program.

19. A computer according to claim 18 including means to prevent the selection of a program in said computer when the programs waiting for execution by said computer are of lesser urgency rank than the program being executed in said computer.

20. A computer according to claim 19 wherein said means to prevent the interruption includes means controlled by a programmed command.

References Cited in the file of this patent

UNITED STATES PATENTS

| | | |
|---|---|---|
| 2,636,672 | Hamilton et al. | Apr. 28, 1953 |
| 2,658,681 | Palmer et al. | Nov. 10, 1953 |

OTHER REFERENCES

Data Control, "Computer System to Handle Multiple Programs Simultaneously," March 1959, pp. 64 and 65 relied upon.